United States Patent [19]

Hahn et al.

[11] Patent Number: 5,033,861

[45] Date of Patent: Jul. 23, 1991

[54] ROTARY EXTRUDER WITH INTERNALLY HEATED ROTOR

[75] Inventors: Granville J. Hahn; Sammy K. Flud, both of Big Spring, Tex.

[73] Assignee: Permian Research Corp., Big Spring, Tex.

[21] Appl. No.: 454,756

[22] Filed: Dec. 19, 1989

Related U.S. Application Data

[63] Continuation-in-part of Ser. No. 347,152, May 3, 1989, Pat. No. 4,887,907.

[51] Int. Cl.$^5$ .............................. B29B 1/08; B01F 15/06
[52] U.S. Cl. ........................................ 366/99; 366/147
[58] Field of Search ...................... 366/78, 79, 98, 99, 366/144, 145, 147, 22, 24, 77; 99/348; 425/378.1, 209, 205

[56] References Cited

U.S. PATENT DOCUMENTS

| 4,067,553 | 1/1978 | Yamaoka | 366/147 |
| 4,082,488 | 4/1978 | Brinkschroder | 425/378.1 |
| 4,734,240 | 3/1988 | Chung | 425/378.1 |

Primary Examiner—Robert W. Jenkins
Attorney, Agent, or Firm—Ross, Howison, Clapp & Korn

[57] ABSTRACT

A rotor assembly for use in a rotary extruder, comprising a rotor rotatably mounted inside a barrel by means of drive and free end bearing assemblies; a coaxial longitudinal bore extending into the rotor from its free end; a conduit disposed within the bore defining a longitudinally extending annulus therebetween; and rotatable means providing fluid communication between a heating medium inlet and the rotor bore through the longitudinally extending annulus, and between the annulus and a heating medium outlet through the conduit.

1 Claim, 2 Drawing Sheets

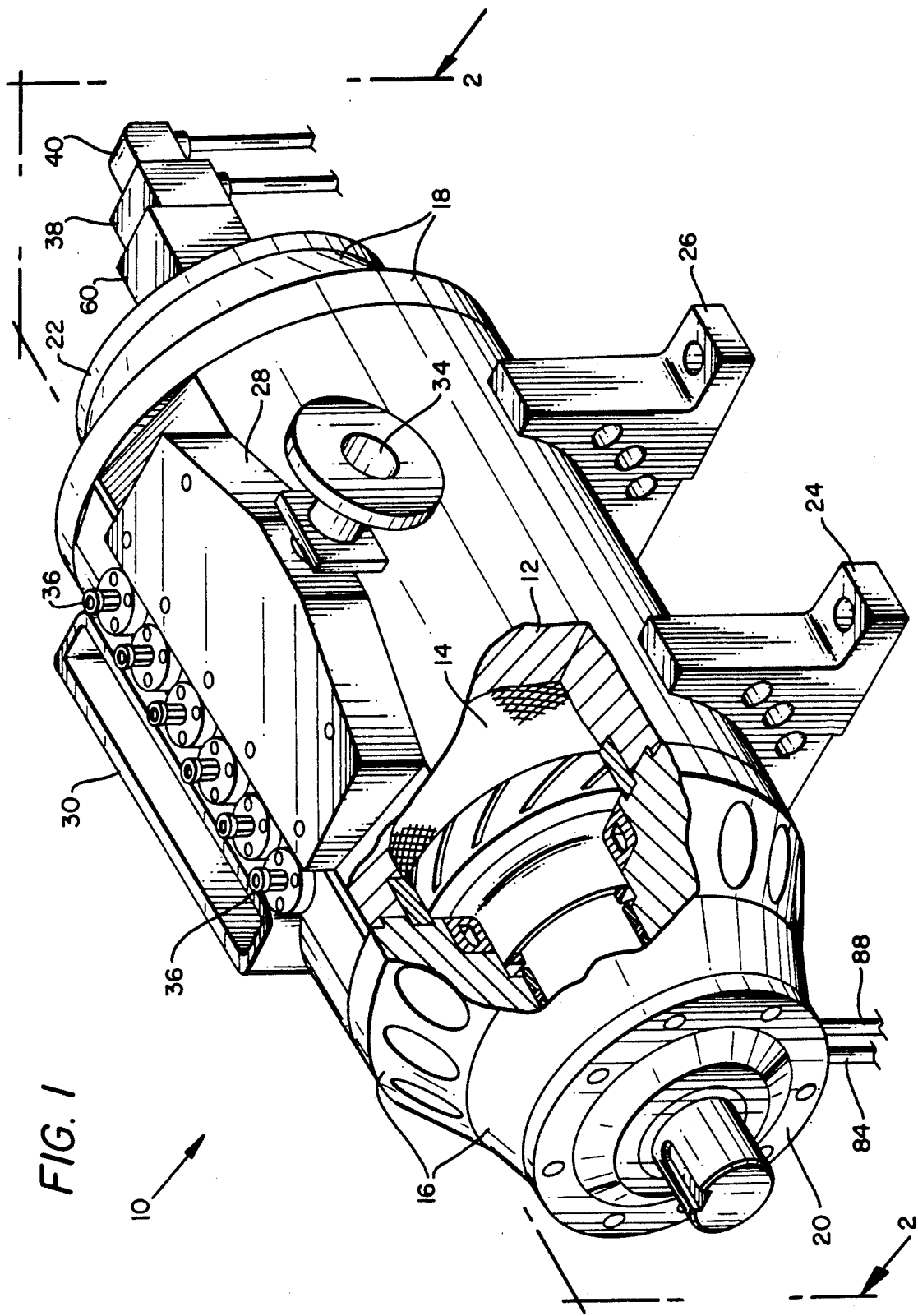

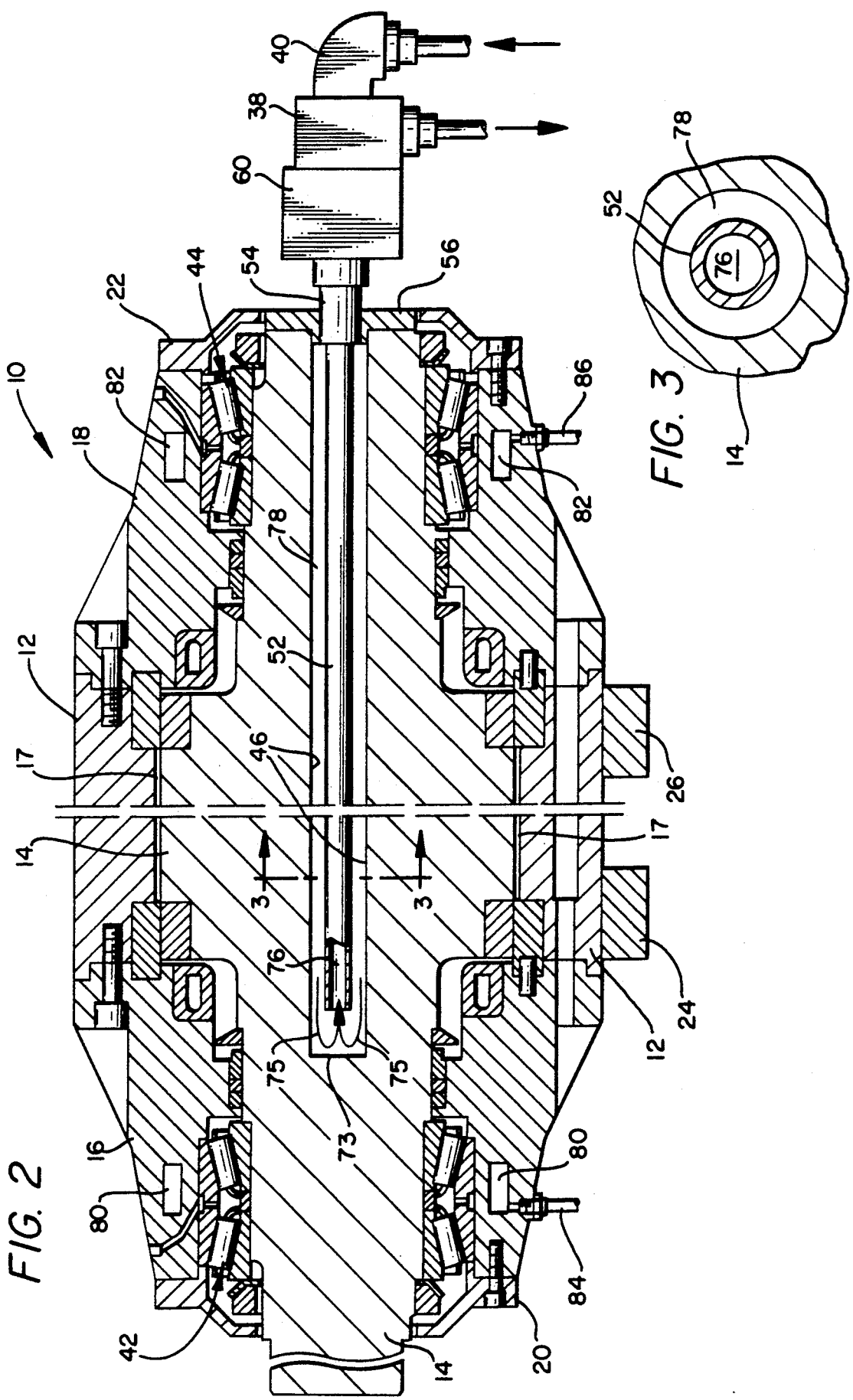

ROTARY EXTRUDER WITH INTERNALLY HEATED ROTOR

CROSS REFERENCE TO RELATED APPLICATION

This application is a continuation in part of U.S. application Ser. No. 347,152, filed May 3, 1989, now issued as U.S. Pat. No. 4,887,907.

TECHNICAL FIELD

This invention relates to rotary extruders, and more particularly, to rotary extruders adapted for plasticizing polymeric resins. This invention further relates to rotary extruders having internally heated rotors.

BACKGROUND OF THE INVENTION

As used herein, the term "rotary extruder" refers to an extruder having a barrel section with an eccentric bore, and a rotor that comprises a substantially cylindrical plasticizing surface rotatably mounted within the bore. Polymeric resin, typically in the form of pellets, flakes or powder, is introduced into a clearance zone between the rotor and the interior surface of the barrel through a feed port. The resin is then plasticized and delivered to a discharge port as the rotor rotates within the stationary barrel. Extruders of this general type, which differ substantially from conventional rotating screw extruders, have previously been disclosed, for example, in U.S. Pat. Nos. 3,880,564; 4,012,477; 4,501,543; and 4,813,863.

In order to successfully plasticize thermoplastic resin within a rotary extruder, the rotor and barrel portions of the extruder are desirably maintained at a temperature above the melting point of the polymer being plasticized. In the past, rotary extruders have been preheated by the use of peripherally spaced cartridge heaters disposed in bores extending longitudinally through the barrel opposite but parallel to the plasticizing surface of the rotor.

In U.S. Pat. No. 4,887,907, we disclosed apparatus for internally cooling the portion of the rotor adjacent to the bearings to reduce bearing temperature and increase bearing life. Such a feature is especially desirable when extruding resins having high melting points. In that disclosure, however, a dead air space was provided to insulate the middle section of the rotor from heat transfer between the rotor surface and the recirculated coolant.

In some instances, however, difficulties have been encountered in preheating the rotary extruder and in stabilizing the temperature of the rotor surface. These difficulties are especially noticeable at the start of a production run, before any significant heat buildup occurs from shearing polymer within the extruder.

A rotary extruder is therefore needed that is adapted for use in those applications where it is desired to selectively increase the temperature of the plasticizing surface of the rotor.

SUMMARY OF THE INVENTION

According to the present invention, a rotary extruder is provided that comprises means for internally heating the rotor. According to a preferred embodiment of the invention, a rotary extruder is provided that is adapted to receive and permit the circulation of a fluid heating medium through the rotor of the extruder.

According to one preferred embodiment of the invention, a rotary extruder is provided that comprises a rotor assembly having a centrally disposed axial bore substantially coextensive with the plasticizing surface of the rotor. The axial bore within the rotor is preferably adapted to receive a coaxial, substantially cylindrical conduit slightly shorter than the length of the bore. The cylindrical conduit has an outer diameter less than the interior diameter of the bore and an inner diameter sufficient to accommodate the desired flow of heating medium.

The axial bore and the conduit are preferably adapted to communicate through a rotatable union disposed at the free end of the rotor with heating medium supply means and heating medium recovery means, respectively. When constructed in this manner, the temperature controlled heating medium is introduced into the rotor through the rotatable union, and then flows axially into the rotor through the annular space between the inwardly facing wall of the rotor, which defines the axial bore, and the outside surface of the conduit. Upon reaching the blind end of the axial bore within the rotor, the heating medium is returned to the heating medium recovery means through the conduit.

BRIEF DESCRIPTION OF THE DRAWINGS

The apparatus of the invention is further described and explained in relation to the following figures of the drawings wherein:

FIG. 1 is a perspective view of a rotary extruder that is partially broken away to reveal the outer surface of the rotor that is rotatably mounted therein;

FIG. 2 is a cross-sectional view taken along line 2—2 of FIG. 1; and

FIG. 3 is a sectional detail view taken along line 3—3 of FIG. 2.

Like numerals are used to indicate like parts in all figures of the drawings.

DESCRIPTION OF THE PREFERRED EMBODIMENTS

Referring to FIGS. 1 and 2, rotary extruder 10 preferably comprises substantially cylindrical barrel 12 having rotor 14 rotatably mounted therein. Rotor 14 is supported within barrel 12 by bearing assemblies 42, 44 disposed inside drive end plate 16 and free end plate 18, which are maintained there by drive end retainer 20 and free end retainer 22, respectively. Barrel 12 is secured to a supporting surface by mounting legs 24, 26. Rotary extruder 10 further comprises inlet port 30 in barrel 12 through which the feed material is introduced into the extruder, annulus 17 in which the polymeric material is plasticized, and discharge port 34 in discharge manifold 28 through which the plasticized extrudate exits the extruder. Adjustable restrictor bar assembly 36 controls the amount of plasticized material that is carried back past the inlet port 30 during each rotation of rotor 14 within barrel 12.

Referring to FIGS. 1 through 3, apparatus is disclosed for internally heating rotor 14 either prior to or during operation of the extruder. If desired, the internally heated rotor assembly disclosed herein can be used in combination with conventional cartridge heaters spaced around the periphery of the barrel as previously disclosed for more rapid heating of the rotary extruder. Internally heated rotor 14 preferably further comprises longitudinally extending, axial bore 46 that extends coaxially through the center of rotor 14 from its free end (opposite the drive end) to end wall 73. End wall 73 is preferably disposed longitudinally between bearing assembly 42 and the end of barrel 12, so that axial bore 46 extends through the portion of rotor 14 that parallels annulus 17 between barrel 12 and rotor 14.

Cylindrical conduit 52, preferably slightly shorter than axial bore 46, is disposed within axial bore 46, defining longitudinally extending annulus 78 therebetween. Cylindrical conduit 52 is preferably maintained in concentric alignment with bore 46 by collar 54, which threadedly engages a concentric bore in retainer ring 56. Retainer ring 56 is preferably adapted to rotate with rotor 14 within free end retainer 22 of rotary extruder 10.

Cylindrical conduit 52 is preferably made of steel pipe. The inside diameter of conduit 52 should be sufficient to accommodate the desired range of flow rates for the heating medium, and the outside diameter of conduit 52 should be such that the resultant annular space between bore 46 and conduit 52 is large enough to accommodate the same flow.

Rotatable union 60 provides fluid communication between heating medium inlet 38 and annular passage 78, and between interior passage 76 of conduit 52 and heating medium outlet 40 as rotor 14 is rotated within barrel 12 by a drive means (not shown). The heating medium is preferably introduced into annulus 78 through inlet 38 and collar 54 from an external heating medium supply means at a flow rate and pressure that will vary according to the length of rotor 14, the diameters of bore 46 and conduit 52 and the physical properties of the heating medium utilized. The temperature of the heating medium when introduced into annulus 78 will preferably be higher than the melting point of the polymer to be extruded, but will vary according to the particular polymer, ambient conditions, the amount of heat available from other heating means in barrel 12, and the like.

The heating medium is preferably introduced into annulus 78 so as to contact bore 46 of rotor 14 while at its highest temperature, thereby establishing a more favorable temperature gradient between the incoming fluid and rotor 14 than would be the case if the incoming heating medium were first introduced into interior 76 of conduit 52. When the heating medium contacts end wall 73 of axial bore 46, the heating medium flows into the open end of conduit 52 as shown by arrows 75, back through interior 76 of conduit 52 countercurrent to the incoming flow through annulus 78, and out collar 54 and outlet 40 to a heating medium recovery means.

The heating medium is preferably a liquid such as an oil, for example, having a boiling point sufficiently high that a desirable temperature gradient can be established between the core and surface of rotor 14. The heating medium supply and recovery means are preferably conventional, commercially available devices as used in other hot oil circulation systems comprising tanks, flow lines, one or more pumps, thermostats, and the like, and are not shown in the drawings.

While the present invention is primarily intended for use in preheating rotary extruders and for maintaining the temperature at the surface of rotor 14 above the melting point of the polymer to avoid having plasticized polymer solidify on the rotor surface until steady state operation is reached, it will be appreciated by those of ordinary skill in the art that the subject invention can be utilized with conventional temperature monitoring and control systems to stabilize the temperature of rotor 14 within a desired range continuously during operation of rotary extruder 10.

Annular coolant circulation channels 80, 82 are desirably provided in end plates 16, 18 for use in cooling bearing assemblies 42, 44 to prolong bearing life. Coolant supply lines 84, 86 supply coolant to channels 80, 82, respectively. Coolant return line 88 as shown in FIG. 1 is provided to return warmed coolant for recooling and recirculation through rotary extruder 10. The corresponding coolant return line for supply line 86 is not visible in FIG. 1. It will also be understood and appreciated that additional coolant channels can be incorporated into the design of end plates 16, 18 to control the temperature of bearing assemblies 42, 44 as needed. Because axial bore 46 extends through the free end of rotor 14 radially inward from bearing assembly 44, bearing assembly 44 may require more cooling than bearing assembly 42 to maintain the same operating temperature in both bearing assemblies.

Other alterations and modifications of the subject invention will likewise become apparent to those of ordinary skill in the art upon reading the present disclosure, and it is intended that the present invention be limited only by the broadest interpretation of the appended claims to which the inventors are legally entitled.

We claim:

1. A rotary extruder comprising a barrel having an eccentric bore and a rotor rotatably mounted within said bore, said rotor comprising a substantially cylindrical outer surface section adapted to coact with said eccentric bore of said barrel to plasticize polymeric resin introduced therebetween whenever said rotor is rotated within said barrel, said rotor further comprising: a centrally disposed, axially extending internal bore bounded by an interiorly facing surface of said rotor; a conduit coaxially disposed within said bore; a longitudinally extending annulus between said conduit and said bore; means for providing fluid communication between said annulus and the interior of said conduit; means for introducing a heating medium into said annulus to contact said bore; and means for recovering said heating medium from said conduit.

* * * * *